April 28, 1964 P. BLOCK 3,130,875
CONTAINER FOR DISPENSING PURPOSES
Filed Aug. 30, 1960
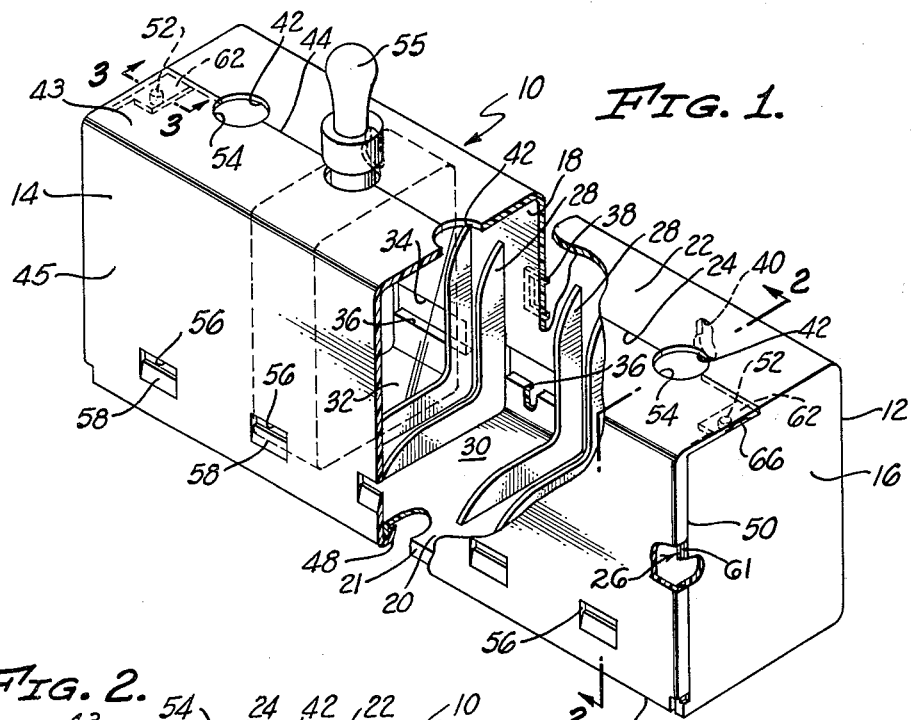
INVENTOR.
PETER BLOCK
BY HIS ATTORNEYS.
HARRIS, KIECH, RUSSELL & KERN

United States Patent Office 3,130,875
Patented Apr. 28, 1964

3,130,875
CONTAINER FOR DISPENSING PURPOSES
Peter Block, San Marino, Calif., assignor to Derse Products, Inc., San Marino, Calif., a corporation of California
Filed Aug. 30, 1960, Ser. No. 52,957
6 Claims. (Cl. 222—143)

This invention relates to containers, and more particularly to a compact container for dispensing purposes wherein an assortment of substances may be housed within a single unit having dispensing means thereon for conveying such substances to the exterior thereof. Although my container is adaptable for many uses, it is especially adapted for use as a cosmetic dispenser and will be described in connection therewith although I do not desire to be limited to such use.

Prior containers of this type, in addition to being somewhat cumbersome and awkward, have failed to provide a user or supplier thereof with a simple means of directly ascertaining the contents placed therewithin, nor have they provided proper means for replacing a depleted supply of the substances housed therein.

Accordingly, it is an object of the invention to provide a novel container which is so arranged and constructed that the contents thereof can be ascertained without opening the container or removing it from its displayed position. More particularly, it is an object to provide such a container having viewing apertures incorporated therein whereby the contents can be viewed without disturbing the container.

Another object of the invention is to provide a container having a simple and efficient access means to the substances housed therein in order to promote rapid replacement of a depleted supply.

A further object of this invention is to provide a container having separating members secured to the interior thereof to create an individual section for each substance contained therein.

A still further object of this invention is to provide a container having an interior region divided into separate sections and to provide at least one viewing aperture for each section to enable a user or a supplier thereof to view the contents.

Another object of this invention is to provide a container including a housing having an open portion, separating members secured to the interior thereof opposite the open portion, and a cover member detachably connected to the housing for covering the open portion, and having at least one viewing aperture therein for each individual interior section created by the separating members.

It is another object of this invention to provide a container including a housing having an opening with separating members secured to the interior of the housing opposite the opening and spaced windows located in such housing intermediate the separating members and opposite the opening to act as a light source, and a cover member detachably connected to the housing for covering the opening and having at least one viewing aperture commensurate with each window in the housing.

A further important object of this invention is to provide a container including a housing and a detachable cover member providing at the junction thereof at least one opening of a size to receive a common dispensing means such as a siphon or the like.

A still further object of this invention is to provide a novel container which is very pleasing in appearance, rugged in construction, and relatively inexpensive to manufacture. More particularly, it is an object to provide such a container which is molded from plastic material and which is constructed to provide a modern appearance so as to be suitable for display purposes when used in retail stores and the like.

Another important object is to provide a container of small size and compact construction which is adapted for a multiplicity of uses and can be moved readily from place to place for display purposes.

The invention also comprises novel details of construction and novel combinations and arrangements of parts, which will more fully appear in the course of the following description. The drawing and the description disclose a preferred embodiment of the present invention, which is given by way of illustration or example.

In the drawing:
FIG. 1 is a perspective view showing a portion of the invention in partial cross-section;
FIG. 2 is a cross-sectional view of the invention taken along the arrowed line 2—2 of FIG. 1; and
FIG. 3 is a fragmentary cross-sectional view taken along the arrowed line 3—3 of FIG. 1.

Referring to the drawing, FIG. 1 exhibits a container 10 preferably made of semi-rigid polyethylene, or the like, including a housing 12 and a cover member 14. The housing 12 consists of opposing parallel side walls 16, a longitudinal wall 18 extending therebetween and forming the back thereof, a bottom wall 20 terminating at the forward edge thereof in a down-turned flange 21, and a partial top wall 22 spaced from the bottom wall 20 and extending forwardly a distance substantially equal to one-half the width of the side walls 16 and terminating in a leading edge 24. The housing provides an opening 26 defined by the leading edge 24 of the partial top wall 22, the opposing side walls 16, and the down-turned flange 21 of the bottom wall 20.

Located substantially opposite the opening 26 and formed integrally with the housing 12 are a plurality of spaced separating members 28. The separating members 28 conform to right angles and protrude from the interior of the longitudinal wall 18 and the interior of the bottom wall 20. Further, such separating members 28 substantially define separate interior sections 30 within the housing 12 for receiving transparent or translucent bottles 32 or the like for holding cosmetics or other substances for dispensing purposes.

The housing 12 provides a light admitting means including windows 34 spaced along the longitudinal wall 18, each window 34 being located intermediate a pair of spaced separating members 28 so as to permit outside light to enter each interior section 30 of the housing 12. Protruding rearwardly from the periphery of each window 34 is an abutment flange 36. Further, additional abutment flanges 38 are spaced along the exterior of the longitudinal wall 18. The abutment flanges 36 and 38 function as a means for spacing the container 10 from a surface in the event such container is placed thereagainst or hung thereon as by hooks or the like being placed within slots 40 also located in the longitudinal wall 18. By spacing such wall 18 from the surface on which it is mounted, light is permitted to pass through the windows 34 and partially illuminate the interior of the housing 12.

Spaced along the leading edge 24 of the partial top wall 22 are inwardly extending semi-circular recesses 42, each recess 42 being provided to correspond with an interior section 30 of the housing 12.

The previously mentioned cover member 14 is of a size to completely close the opening 26 of the housing 12 and is detachably connected thereto. The cover member 14 includes a rearwardly directed partial top 43 terminating in an upper edge 44, a downwardly directed front 45 terminating in a lower edge 46 having a substantially upturned, rearwardly extending, U-shaped portion 48, and relatively short, rearwardly-extending side edges 50 located adjacent the front 45. Further, the top 43 provides downwardly extending lugs 52 positioned adjacent the opposing side walls 16.

Spaced along the upper edge 44 of the top 43 are inwardly extending semi-circular recesses 54 commensurate with the recesses 42 in the partial top wall 22. When the cover member 14 is placed in a closed position on the housing 12, the above semi-circular recesses 42 and 54, respectively, merge to form circular means for receiving common dispensers 55 or the like. Such common dispensers may be of the syringe type, as shown in FIG. 1, or they may be siphon type dispensers, or even ladle type devices used for dispensing viscous medium housed within the container 10.

The front 45 of the cover member 14 provides spaced viewing apertures 56 therein, each aperture 56 corresponding to one of the interior sections 30 and consequently to one of the windows 34 located in the longitudinal wall 18. The apertures 56 are provided to permit a user of the instant device to directly ascertain the contents thereof. A user when looking through one of the apertures 56 is able to see the particular contents contained within one of the bottles 32 with the aid of the illumination provided by the windows 34. Immediately below each aperture 56 is an inclined surface 58 on which may be placed a label or the like bearing some indicia of the contents housed therewithin.

The cover member 14 is placed in closed position on the housing 12 by engaging the up-turned, rearwardly extending U-shaped portion 48 with the down-turned flange of the bottom wall 20 (as shown in FIG. 2), the bottom wall 20 being raised upwardly from any surface upon which it might be resting by transverse supports 60. The transverse support members 60 extend downwardly from the bottom wall a distance greater than the length of the downturned flange and the cover member, at the bottom of the U-shaped portion 48, has a thickness less than the difference in length between such transverse members and the downturned flange. The relatively short side edges 50 of the cover member 14 overlap beveled portions of the housing's opposing side walls 16, and the lugs 52 of the cover member 14, owing to the resiliency of the top 43 thereof, snap fit into holes 64 provided in tabs 62 formed integrally with the opposing side walls 16 as a securing means. For removing the cover member 14, small fingernail-size recesses 66 are provided at the sides of the top 43 adjacent the lugs 52.

In actual operation, a number of bottles 32, or the like, each filled with a different cosmetic, would be placed within the open housing 12. Each bottle would be received within an interior section 30 defined by the separating members 28. A common dispensing means or apparatus such as shown at 55 would then be secured to each bottle. The cover member 14 would then be moved into a closed position in the manner heretofore described and the container 10 is then ready to dispense the contents housed therein. The apertures 56 may be utilized by both users and suppliers to directly ascertain the contents of each separate interior section 30.

Although the container 10 has been employed here in relation to the dispensing of specific substances, the structure is equally applicable to any situation where a common dispensing means is used to dispense any substance from a container. Further, it will be understood that various modifications, minor changes, and substitutions may be incorporated in such embodiment without departing from the spirit of the invention is defined by the claims which follow.

I claim:

1. In a container for dispensing purposes, the combination of:

a housing having opposing side walls, each side wall providing a securing means formed integrally therewith, a longitudinal wall extending therebetween, a bottom wall terminating at the forward edge thereof in a down-turned flange, a partial top wall providing at its leading edge at least a pair of recess extending inwardly therefrom, an opening extending between said opposing side walls and defined by said side walls, the leading edge of said partial top wall, and said bottom wall, said housing providing at least one separating member secured to the interior of said housing opposite said opening for every pair of recesses provided in the leading edge of said partial top wall, and at least a pair of opposed transverse support members extending downwardly from said bottom wall a distance greater than the length of said downturned flange; and a cover member detachably connected to said housing and of a size to close said opening, said cover member having an upper edge and a lower edge, said upper edge providing at least one inwardly extending recess therein commensurate and mating with each recess in said leading edge of said partial top wall and providing means extending downwardly therefrom for engagement with said securing means formed integrally with said opposing side walls, said lower edge terminating in an up-turned, rearwardly extending, U-shaped portion engageable with said down-turned flange of said bottom wall of the housing said cover member at the bottom of said U-shaped portion having a thickness less than the difference in length between said transverse support members and said downturned flange of the bottom wall, and said cover member providing intermediate said upper and lower edges at least one aperture for each interior section of said housing created by said separating member.

2. A container for dispensing purposes as defined in claim 1 wherein said housing provides at least one window in said longitudinal wall for each interior section created by said separating member.

3. In a container for dispensing purposes, the combination of:

a housing having opposing side walls, each side wall providing a securing means formed integrally therewith, a longitudinal wall extending therebetween, a bottom wall terminating at the forward edge thereof in a downturned flange, a partial top wall providing at its leading edge at least a pair of recesses extending inwardly therefrom, an opening extending between said opposing side walls and defined by said side walls, the leading edge of said partial top wall, and said bottom wall, said housing providing at least one separating member secured to the interior of said housing opposite said opening for every pair of recesses provided in the leading edge of said partial top wall, said housing further providing at least one window in said longitudinal wall for each interior section created by said separating member, said housing providing, on the exterior of said longitudinal wall, at least one abutment flange positioned adjacent said window and a plurality of abutment flanges spaced along said wall, said abutment flanges extending rearwardly from said wall, and at least a pair of opposed transverse support members extending downwardly from said bottom wall a distance greater than said downturned flange; and a cover member detachably connected to said housing and of a size to close said opening, said cover member having an upper edge and a lower edge, said upper edge providing at least a pair of inwardly extending recesses therein commensurate and mating with the recesses in said leading edge of said partial top wall and providing means extending downwardly therefrom for engagement with said securing means formed integrally with said opposing side walls, said lower edge terminating in an up-turned, rearwardly extending, U-shaped portion engageable with said down-turned flange of said bottom wall of the housing, said cover member at the bottom of said U-shaped portion having a thickness less than the difference in length between said transverse support members and said downturned flange of the bottom wall, and said cover member providing intermediate said upper and lower edges at least one aperture for each interior section of said housing created by said separating member.

4. A container for dispensing purposes as defined in claim 3 wherein said housing provides at least one mounting slot in said longitudinal wall spaced above said abutment flanges.

5. In a container for receiving a plurality of dispensers for dispensing purposes, the combination of:
   a housing having an opening therein and at least one separating member within the interior thereof and extending substantially transverse to the longitudinal axis of said housing and defining a dispenser receiving space on each side thereof within said housing for receiving said dispensers, said housing also having a wall providing apertures therein respectively communicating with the dispenser receiving spaces created by said separating member and located opposite said opening; and
   a cover member detachably connected to said housing and of a size to close said opening, said cover member having a wall including apertures therein respectively communicating with the dispenser receiving spaces within said housing created by said separating member and providing for unobstructed light transmission through the interior of said housing between said apertures located in said housing wall opposite said opening and said apertures located in said cover member wall, and said cover member having means for receiving said dispensers therein.

6. The combination as defined in claim 5 wherein said housing provides an abutment flange on the exterior thereof adjacent the apertures in said housing and extending outwardly from said housing.

References Cited in the file of this patent

UNITED STATES PATENTS

| | | |
|---|---|---|
| 470,018 | Strong | Mar. 1, 1892 |
| 2,361,926 | Brogden | Nov. 7, 1944 |
| 2,626,200 | Patch | Jan. 20, 1953 |
| 2,670,103 | La Mers et al. | Feb. 23, 1954 |
| 2,990,086 | Williams | June 27, 1961 |

FOREIGN PATENTS

| | | |
|---|---|---|
| 14,083 | Norway | May 8, 1905 |
| 452,143 | Great Britain | Aug. 12, 1936 |